United States Patent [19]
Carter

[11] Patent Number: 5,418,039
[45] Date of Patent: May 23, 1995

[54] REFLECTIVE PATTERNED GLASS PRODUCT AND COATING METHOD

[75] Inventor: Thomas M. Carter, Valencia, Pa.

[73] Assignee: PPG Industries, Inc., Pittsburgh, Pa.

[21] Appl. No.: 677,946

[22] Filed: Apr. 1, 1991

[51] Int. Cl.⁶ ............................................ B32B 3/00
[52] U.S. Cl. ...................... 428/195; 428/76; 428/426; 428/432; 428/433
[58] Field of Search .......... 52/514, 311, 314; 428/195, 426, 432, 76, 433

[56] References Cited

U.S. PATENT DOCUMENTS

| | | | |
|---|---|---|---|
| 3,869,198 | 3/1975 | Ballentine | 350/259 |
| 3,951,525 | 4/1976 | Ballentine | 350/259 |
| 4,093,754 | 6/1978 | Parsons | 427/259 |
| 4,133,919 | 1/1979 | Parsons | 427/259 |
| 4,199,358 | 4/1980 | Parsons | 430/308 |
| 4,294,881 | 10/1981 | Meyer et al. | 428/426 |
| 4,340,646 | 7/1982 | Ohno et al. | 428/426 |
| 4,394,064 | 7/1983 | Dauson | 350/259 |
| 4,478,905 | 10/1984 | Neely, Jr. | 428/324 |
| 4,606,788 | 8/1986 | Meran | 430/313 |
| 4,610,115 | 9/1986 | Thompson, Jr. | 52/171 |
| 4,619,850 | 10/1986 | Charlton | 52/311 |
| 4,997,687 | 3/1991 | Carter | 428/195 |
| 5,030,503 | 7/1991 | Carter et al. | 428/195 |
| 5,055,358 | 10/1991 | Livingston et al. | 428/426 |

*Primary Examiner*—Patrick J. Ryan
*Assistant Examiner*—William Krynski
*Attorney, Agent, or Firm*—Donna L. Seidel

[57] ABSTRACT

A patterned light and heat reflective product comprising a substrate with a discontinuous pattern of light and heat reflective coating is disclosed, along with a method for its production, comprising the steps of applying a pattern of resist material to a substrate surface, depositing a continuous light and heat reflective coating over the resist pattern, removing the resist material and thereby also removing the portion of light and heat reflective material overlying the resist material to produce a light and heat reflective coating in a pattern complementary to the pattern of resist material.

2 Claims, 1 Drawing Sheet

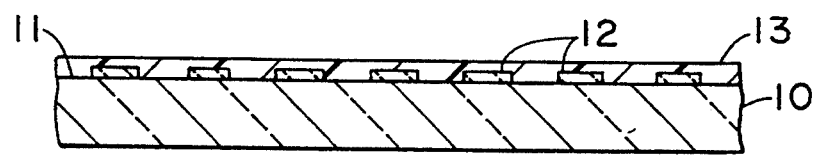
F I G. 1
F I G. 2

REFLECTIVE PATTERNED GLASS PRODUCT AND COATING METHOD

BACKGROUND OF THE INVENTION

Curtainwall architecture comprises both vision areas and opaque areas referred to as spandrels. Spandrel areas are formed by panels which are either intrinsically opaque or made opaque by the inclusion of an opaque coating or backing material. Spandrel panels are generally employed to conceal portions of the structure of a building which are not aesthetically pleasing if visible from the exterior of the building. For example, spandrel panels may be used to conceal floor slabs, air conditioning equipment, heating ducts and so on. Spandrel panels may also be used to maintain privacy or security, e.g., at the ground level of a building.

A variety of spandrel panels that closely match or pleasingly contrast in color and reflectivity with adjacent transparent glass panels in curtainwall construction have been developed. Increasing use of highly reflective transparent metal and metal oxide coatings has led to the development of matching spandrel panels. U.S. Pat. No. 3,869,198 discloses spandrel panels provided with a transparent light and heat reflective coating on the outwardly glazed glass surface and a substantially opaque ceramic enamel coating adhered to the inwardly glazed glass surface. These spandrels provide for aesthetically matched vision and spandrel areas in curtainwall construction by utilizing a ceramic enamel coating which reflects light in the same spectral region as the light transmitted by the transparent coating and glass combination. U.S. Pat. No. 3,951,525 discloses spandrel panels with transparent light and heat reflective coatings on the inwardly glazed glass surface and with substantially opaque ceramic enamel coatings adhered to the transparent light and heat reflective coatings. The spandrels are aesthetically matched to vision areas in curtainwall construction by utilizing a ceramic enamel coating which reflects light in the same spectral region as light transmitted by the transparent coating.

In some architectural installations, it is desirable to have a spandrel panel which has a different surface appearance from the high reflectivity of a metal or metal oxide coating or the glossiness of glass. U.S. Pat. No. 4,394,064 to Dauson discloses a durable spandrel panel comprising a rigid panel substrate, a ceramic enamel coating of a desired color, and a transparent protective metal oxide overcoating. In some applications, the substrate is preferably transparent, so that the color of the ceramic enamel coating is visible from both the exterior and the interior of the building. Glass is a particularly desirable substrate.

SUMMARY OF THE INVENTION

In some architectural installations, it is desirable to have a glass product which has a patterned appearance allowing varying light transmittance with a light and heat reflective coating. The present invention provides a durable glass panel comprising a transparent glass substrate, and a discontinuous, patterned light and heat reflective coating deposited by forming a removable resist pattern on a surface, depositing a continuous light and heat reflective coating over the resist patterned surface, and then removing the resist, along with the portion of the coating deposited thereon to form a discontinuous patterned light and heat reflective coating on the substrate surface.

DESCRIPTION OF THE DRAWING

FIG. 1 illustrates a discontinuous resist pattern 12 on surface 11 of transparent substrate 10, overcoated with a continuous light and heat reflective coating 13.

FIG. 2 illustrates a discontinuous pattern light and heat reflective coating 13 on surface 11 of transparent substrate 10 after removal of resist material and the portion of light and heat reflective coating in overlying the resist material.

DESCRIPTION OF THE PREFERRED EMBODIMENTS

Preferred glass panels in accordance with the present invention comprise a transparent glass substrate coated with a pattern of light and heat reflective material deposited by any suitable coating process such as pyrolytic deposition, wet chemical deposition, chemical vapor deposition, etc. A preferred method of depositing the reflective coating is magnetron sputtering. The panel substrate may be any suitable glass material, but is preferably clear flat glass. Typical soda-lime-silica glasses are preferred. However, tinted glasses may also be employed, such as the heat-absorbing glasses sold by PPG Industries, Inc. under the trademarks SOLEX, SOLARBRONZE and SOLARGRAY, the latter two being described in U.S. Pat. No. 3,296,004 and U.S. Pat. Re. No. 25,312 respectively.

In accordance with a preferred embodiment of the present invention, flat glass sheets supported on a horizontal conveyor are moved through a series of operations. First the glass sheets may be moved through a washer where detergent solutions and rotating brushes may be used to remove any dirt from the surface of the glass sheets, which are then dried with air. The glass panel is subjected to screening, wherein a resist pattern is printed onto the glass surface. The resist material may be either organic or inorganic, so long as it may be removed after coating with the light and heat reflective coating. Preferred resist materials are alumina, silica and titanium oxides. Powdered $TiO_2$ for example is preferably dispersed in a carrier liquid such as an oil of suitable viscosity to permit screen printing. A screen of the desired pattern is used to apply the resist, and the carrier is evaporated. The resist printed glass is then coated with a light and heat reflective film, preferably by magnetron sputtering. The film may comprise a metal, metal oxide, metal nitride or other metal compound, and may be a single or multiple layer coating. Further, the film may be high or low visible reflectance and either colorless or preferably colored. The resist material and the light and heat reflecting coating overlying the resist is then removed, preferably by an ordinary washing cycle, but in the case of an organic resist material, by a solvent which does not damage the remaining light and heat reflective coating, leaving a patterned coating of the light and heat reflective coating. A protective metal oxide film, such as tin oxide, may be deposited over the light and heat reflective pattern coating. Other coating layers, either continuous or discontinuous, may also be used either over or under the pattern coating to provide a variety of varying color and reflectance designs.

The resist pattern may in the alternative be overcoated with a light and heat reflective film by a pyrolytic technique, such as those described in U.S. Pat.

Nos. 3,107,117 3,185,586; 3,660,061 and 4,263,335, whereby the resist pattern coated panel is contacted with an organometallic coating reactant capable of thermal decomposition to a metal oxide at a sufficiently high temperature to effect decomposition of the organometallic coating reactant to form a metal oxide film over the resist coating. The metal oxide film is preferably colored and highly reflective. A variety of metal oxides may be used with inorganic resist preferred. Preferably, however, an organic resist pattern is overcoated with a light and heat reflective metal film by magnetron sputtering to facilitate removal of the resist and overlying coating. Many such coatings are known in the art, and the resist pattern coated glass panel may be subjected to the process in the same manner as an uncoated glass substrate. The coating may comprise metal, metal oxide, metal nitride or other metal compounds in either a single or multiple layer coating which may have high or low visible reflectance and may be colorless or, preferably, colored.

The present invention will be more fully understood from the descriptions of specific examples which follow.

EXAMPLE I

A discontinuous resist pattern is applied to a surface of a glass substrate by screen printing a pattern of titanium oxide dispersed in oil, and evaporating the oil. A metallic film is sputtered over the surface of the resist pattern coated glass substrate. The resist material and overlying metallic film are then removed in a glass washer to yield a discontinuous light and heat reflective metal coating in complementary pattern to the resist pattern.

The above example is offered to illustrate the present invention. A wide variety of resist materials may be employed in the pattern printing process. The light and heat reflective coating may be applied by various methods, and the resist and overlying portion of the light and heat reflective coating may be removed by any method which does not damage the remaining portion of the light and heat reflective coating. The scope of the present invention is defined by the following claims.

I claim:

1. An article of manufacture for use as an architectural product comprising:
    a. a glass substrate;
    b. on one surface of said substrate a discontinuous patterned transparent light and heat reflective coating; and
    c. a continuous transparent metal oxide protective coating, wherein the pattern of said coating is complementary to a resist pattern previously screen printed on said surface and removed together with portions of a continuous transparent light and heat reflective coating overlying the resist pattern.

2. An article according to claim 1, wherein said transparent metal oxide protective coating is tin oxide.

* * * * *